March 11, 1952     B. SILL     2,588,772
COMBINED FLASHLIGHT AND CIRCUIT TESTER
Filed June 29, 1950     2 SHEETS—SHEET 1
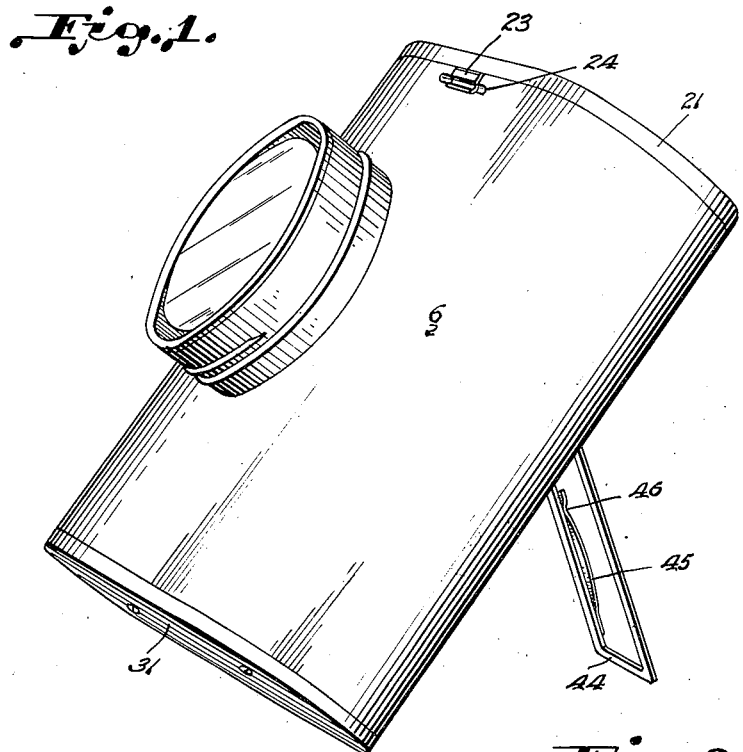
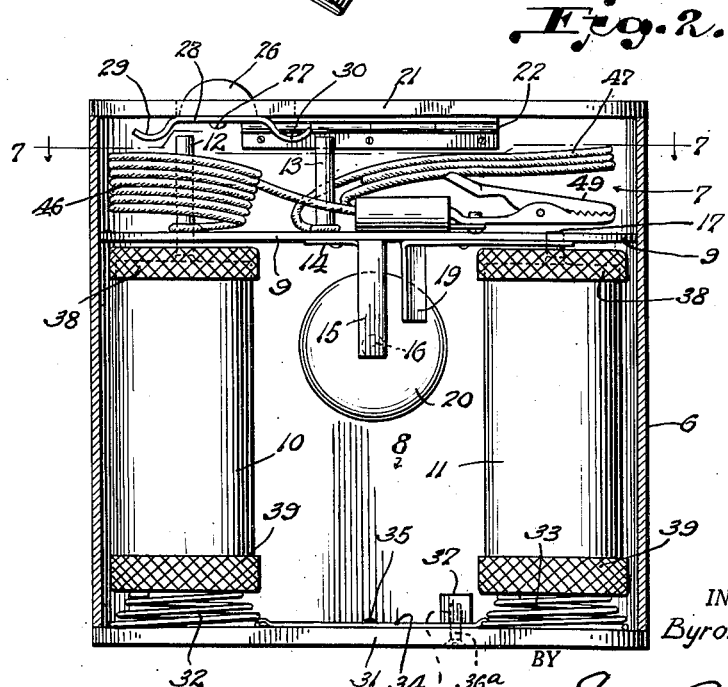
INVENTOR.
Byron Sill
BY
Eugene E. Stevens
ATTORNEY.

March 11, 1952     B. SILL     2,588,772
COMBINED FLASHLIGHT AND CIRCUIT TESTER
Filed June 29, 1950     2 SHEETS—SHEET 2
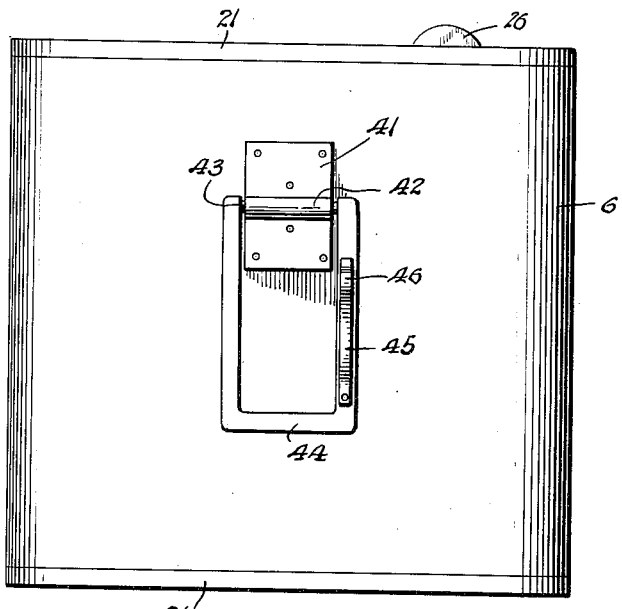
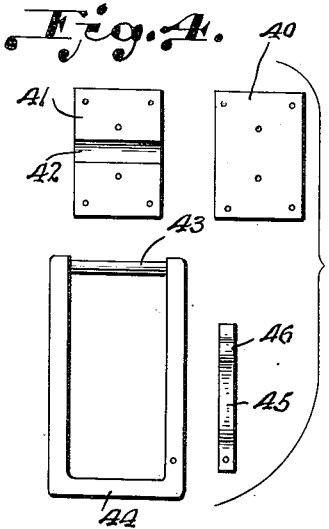
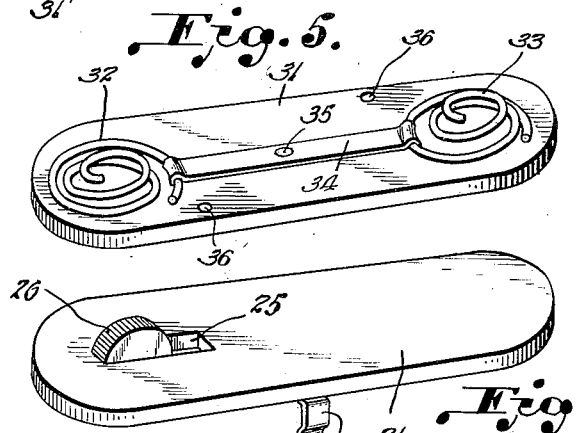
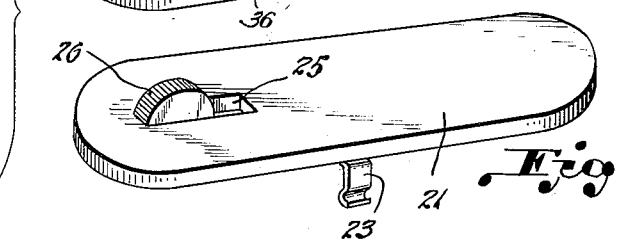
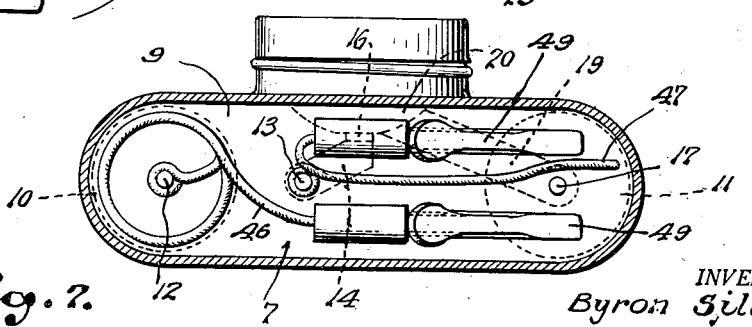
INVENTOR.
Byron Sill
BY
ATTORNEY.

Patented Mar. 11, 1952

2,588,772

UNITED STATES PATENT OFFICE 2,588,772

COMBINED FLASHLIGHT AND CIRCUIT TESTER

Byron Sill, Galveston, Tex.

Application June 29, 1950, Serial No. 171,113

5 Claims. (Cl. 175—183)

This invention relates to a combination utility flashlight and circuit tester.

The main object of the invention is to provide a combined flashlight and circuit tester, the device embodying but a single container or casing which houses the flashlight batteries and electrical connections thereto and, in addition, the casing or housing being interiorly divided into an upper compartment, said upper compartment being closed by a pivoted cover and adapted to receive the lead lines and terminal clips of the circuit testing apparatus when the same are not being used. The upper compartment provides storage space for the lead lines and lead line clips when the same are not being used, but when it is desired that they be used the same are readily and easily accessible by opening the pivoted cover closure.

A further object of the invention is to support the batteries on coiled springs which are riveted to the base, said spring normally urging the batteries upwardly to engagement with their contacts mounted on the partition plate.

Other objects and advantages will become apparent when considered in connection with the accompanying detailed description and drawings in which:

Fig. 1 is a perspective view of the flashlight in assembled relation;

Fig. 2 is a front view in elevation with the front portion of the casing broken away and showing the inner parts of the flashlight and circuit tester;

Fig. 3 is a rear view showing the adjustable angle supporting leg;

Fig. 4 is an exploded view of the angle supporting leg;

Fig. 5 is a perspective view of the bottom plate;

Fig. 6 is a perspective view of the pivoted cover; and

Fig. 7 is a section on line 7—7 of Fig. 2.

Referring specifically to the drawings, in which like numerals have been used to indicate similar parts throughout the various views, the flashlight casing or housing is shown at 6 and is preferably composed of some insulating plastic material. The casing 6 is divided into upper and lower compartments 7 and 8 by a transversely positioned non-conductive plate 9 which may be rigidly secured to the inner wall of the casing 6 at a predetermined position, but preferably at such a height so that the lower compartment 8 will be of such length as to accommodate a pair of batteries 10 and 11.

The transverse plate 9 has secured to the left hand side thereof an upstanding contact pin 12 which passes through the plate and is frictionally held in a vertical position, the lower side of the pin making contact with the usual contact at the center of the battery 10. The plate 9 has a second contact pin 13 frictionally extending through an opening in the plate and has connected to its lower end a metal strap 14, said strap lying for a portion of its length against the under side of the plate 9 and then being bent downwardly at a right angle, the loose end 15 engaging the rear end of the flashlight bulb 16. A third contact pin or button 17 is fitted within a recess within the plate 9; and attached to the underside of said button is a metal contact strip which lies for part of its length against the under side of the plate 9 and is then bent downwardly at a right angle, the free end 19 thereof being soldered or otherwise fixed to the rear surface of the reflector plate 20.

The cover 21 is pivoted to the rear top side of the casing 6 as by a usual hinge 22 and has a spring latch 23 which engages in a depression 24 on the front side of the casing 6. The top 21 is provided at its left hand side with a longitudinal slot 25, said slot receiving a slidable half circle button 26. The button 26 receives a screw 27 which supports a sliding make and break switch contacting wiper 28 having downwardly flared portions 29 and 30, which portions, when the wiper is moved to closed position, contact the contact pins 12 and 13.

The base 31 of the flashlight has disposed adjacent its opposite ends two coiled springs 32 and 33, the lower convolutions of which lie flush on the base and the other convolutions spiral upwardly to resiliently engage with the base portions of the batteries 10 and 11. The springs 32 and 33 are at each inner side rigidly connected to a metallic strip connector 34 which is riveted as at 35 to the base plate 31. The base plate further has oppositely disposed openings 36 over which are screw threaded blocks 37, said blocks being attached to the front and rear sides of the casing and, in registering with the openings 36, permit screws 36a to hold the bottom or base in place on the casing.

The contact pin 12 and the contact button 17 have fastened thereto paper cup-shaped members 38; and, likewise, similar paper cup-shaped members 39 are attached to the upper convolutions of the springs 32 and 33, the paper cups serving to hold the batteries in their proper position.

Attached, as by rivets, to the rear face of the casing 6 is a sheet metal plate 40 to which is attached a metal strap 41 having a bulged portion 42 for frictionally receiving the upper round cross bar 43 of a leg or adapter 44. The leg or link 44 has riveted thereto a spring clip 45 which has a wire-receiving portion 46 which adapts the flashlight to be hung upon a wire or cord if desired. The link-leg 44 can be adjusted to various positions to hold the light at desired angular positions, the same also acting in the capacity of a handle for carrying the flashlight.

One circuit testing lead line 46 is connected at one of its ends to the contact pin 12, while a second circuit testing line 47 is connected to the contact pin 13, each of the free ends thereof having attached thereto spring closed connecting clips 49 of usual and known construction. The upper compartment 7 formed by the partition plate 9 is adapted to receive the circuit testing cords and clips which are concealed from view when the cover 21 is closed. However, when it is desired to use the same they can be readily removed by simply opening the cover 21 for easy access.

In the use of the combined utility flashlight and circuit tester it will be seen that with the cover 21 closed the switch actuating button 26 can be manipulated to slidably move the contact member 28 so that the bulged portions 29 and 30 will engage the contact pins 12 and 13 and thereby complete the circuit to light the flashlight bulb 16, which will burn so long as the contacts are engaged. To interrupt the circuit it is merely necessary to move the switch button 26 to the left, as viewed in Fig. 2, to disengage the contacts.

When it is desired to use the circuit testing leads it is only necessary to open the top 21, remove the leads and their clips and attach the clips across the circuit to be tested, and if the circuit is complete the light bulb 16 will light up indicating a good circuit. If the circuit is bad, then the failure of the bulb 16 to light up will indicate a faulty circuit.

I have, therefore, devised a unique combined utility flashlight and electrical circuit tester, both of which are incorporated within a single unit and either of which can be used separately when occasion arises.

It is not intended that the invention be limited to the exact construction shown, but it is intended that the same be capable of variation and modification within the scope of the following claims.

I claim:

1. A combined utility flashlight and circuit tester, comprising in combination a casing having a cover, a partition plate within the casing and dividing the same into upper and lower compartments, a pair of batteries within the lower compartment and being electrically connected at their bases, a light bulb and reflector extending into the lower compartment, contact pins engaging the upper battery terminals and passing through the partition plate into the upper compartment, one of the pins having a metal strip with one end attached thereto and the other end secured to the reflector, an intermediate contact pin mounted on the partition and having one end of a metal strip fixed thereto and the other end engaging the base of the bulb, a slidable contact switch in the casing cover adapted to contact the intermediate contact pin and one of the battery contact pins to complete the circuit to the bulb and a pair of circuit testing leads having their respective inner ends connected to said contact pins and spring clips attached to their opposite ends, whereby when the sliding switch is moved to off position and the clips attached to a circuit to be tested the bulb will light if the circuit is uninterrupted.

2. A combined flashlight and circuit tester comprising in combination, a casing having a removable base and a pivoted cover, a horizontal partition plate within the casing dividing the casing into upper and lower compartments, a strap metal strip fixed to the base and a pair of convolute springs mounted on the base and connected to the opposite ends of the metal strip, a pair of batteries within the compartment and having their bases mounted on the upper convolutions of the springs, a pair of contact pins mounted within the partition and in contact with the upper battery terminals, a light bulb and reflector mounted within a wall of the casing and having their rear surfaces extending into the lower compartment, a contact strip secured at one end to the reflector and at the other end to one of the battery contact pins, an intermediate contact pin supported by the partition and a contact strip having one end in engagement with the light bulb base and the other end secured to the contact pin, a switch slidable in the cover and having contact arms for engagement and disengagement with one of the battery contact pins and the intermediate contact pin, and circuit testing lead wires one of which is connected to the intermediate contact pin and the other of which is connected to one of the battery contact pins, said leads having clips attached to their respective ends, the leads and clips being confined within the upper housing when the same are not in use.

3. A portable flashlight and circuit tester comprising in combination a casing, an insulated partition dividing the casing into upper and lower compartments, dry cell batteries within the lower compartment and electrical contact means connecting the bases thereof, contact pins mounted in the partition and in contact with the upper ends of the batteries, a reflector and light bulb having portions extending within the lower casing, a contact strip connected at one end to one of the contact pins and its other end fixed to the reflector, an intermediate contact pin mounted in the partition and a contact strip engaging said pin at one of its ends and contacting the light bulb at its other end, a slidable contact switch for connecting the intermediate contact pin and one of the battery contacting pins, and a pair of test lines within the upper compartment, one having its end connected to one of the battery contact pins and the other connected to the intermediate pin, each lead having a contact clip attached to its end.

4. A portable flashlight and circuit tester comprising in combination a casing, an insulated partition dividing the casing into upper and lower compartments, dry cell batteries within the lower compartment and electrical contact means connecting the bases thereof, contact pins mounted in the partition and in contact with the upper ends of the batteries, a reflector and light bulb having portions extending within the lower casing, a contact strip connected at one end to one of the contact pins and its other end fixed to the reflector, and intermediate contact pin mounted in the partition and a contact strip engaging said pin at one of its ends and contacting the light bulb at its other end, a slidable contact switch for connecting the intermediate contact pin and one of the battery contacting pins, a pair of test lines within the upper compartment, one having its end connected to one of the battery contact pins and the other connected to the intermediate pin, each lead having a contact clip attached to its end, and an adjustable friction held leg mounted on the rear of the casing to support the flashlight in various angular positions.

5. A portable flashlight and circuit tester, comprising in combination, a casing having a bottom and side walls, a partition mounted within the casing and providing upper and lower compartments therein, a cover for said upper compartment, means mounting said cover on said casing for movement to and from open and closed positions, at least two batteries in said lower compartment, means mounted on said casing bottom and electrically connecting said batteries together, a reflector, a light bulb mounted therein, said reflector and bulb extending into said lower compartment through a wall thereof, three contact pins fixed in said partition in spaced insulated relation, a first and second pin being electrically connected to separate batteries, means electrically connecting the third pin to said bulb, means electrically connecting said first pin to said reflector, movable switch means on said cover for electrically connecting said second and third pins when said cover is in said closed position so as to open and close a circuit to said bulb, a pair of circuit testing leads stored in said upper compartment and accessible when said cover is open, and said leads having inner ends electrically connected to two of said pins.

BYRON SILL.

REFERENCES CITED

The following references are of record in the file of this patent:

UNITED STATES PATENTS

| Number | Name | Date |
|---|---|---|
| 1,508,990 | Schmidt | Sept. 16, 1924 |
| 2,231,660 | Carlotti et al. | Feb. 11, 1941 |
| 2,234,444 | Martin et al. | Mar. 11, 1941 |
| 2,519,294 | Schneider | Aug. 15, 1950 |
| 2,540,471 | Borsody | Feb. 6, 1951 |